United States Patent
Yasuda

(10) Patent No.: US 11,630,620 B2
(45) Date of Patent: Apr. 18, 2023

(54) AUTHORIZATION CONTROL FOR A PRINTING SYSTEM

(71) Applicant: CANON KABUSHIKI KAISHA, Tokyo (JP)

(72) Inventor: Akihiro Yasuda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/499,338

(22) Filed: Oct. 12, 2021

(65) Prior Publication Data

US 2022/0129219 A1    Apr. 28, 2022

(30) Foreign Application Priority Data

Oct. 23, 2020    (JP) .............................. JP2020-177846

(51) Int. Cl.
*G06F 3/12*    (2006.01)
(52) U.S. Cl.
CPC .......... *G06F 3/1238* (2013.01); *G06F 3/1204* (2013.01); *G06F 3/1222* (2013.01)
(58) Field of Classification Search
None
See application file for complete search history.

(56) References Cited

U.S. PATENT DOCUMENTS 7,916,342 B2 *    3/2011    Natori ................... G06F 3/1285
                                                            358/1.9
2021/0096791 A1 *    4/2021    Nampo ................. G06F 3/1292

FOREIGN PATENT DOCUMENTS

JP    2004192273 A  *  7/2004
JP    2013238924 A    11/2013

OTHER PUBLICATIONS

English translation of Japanese Patent Application 2002-358589, corresponding to Japanese Patent Application Publication 2004-192273. (Year: 2002).*

* cited by examiner

*Primary Examiner* — Thomas D Lee
(74) *Attorney, Agent, or Firm* — Canon U.S.A., Inc., IP Division

(57) ABSTRACT

A printing system including a server connected to a first information processing apparatus and a second information processing apparatus via a network includes a reception unit configured to receive a request to print a file from the second information processing apparatus and a determination unit configured to determine whether a user associated with the second information processing apparatus has a right to print the file, wherein the printing system transmits a first notification for requesting a confirmation about whether to grant the right to the first information processing apparatus in a case where the determination unit determines that the user does not have the right, and wherein the printing system permits the file to be printed from a printing apparatus connected to the server in a case where a confirmation to grant the right is received from the first information processing apparatus as a response to the first notification.

12 Claims, 13 Drawing Sheets

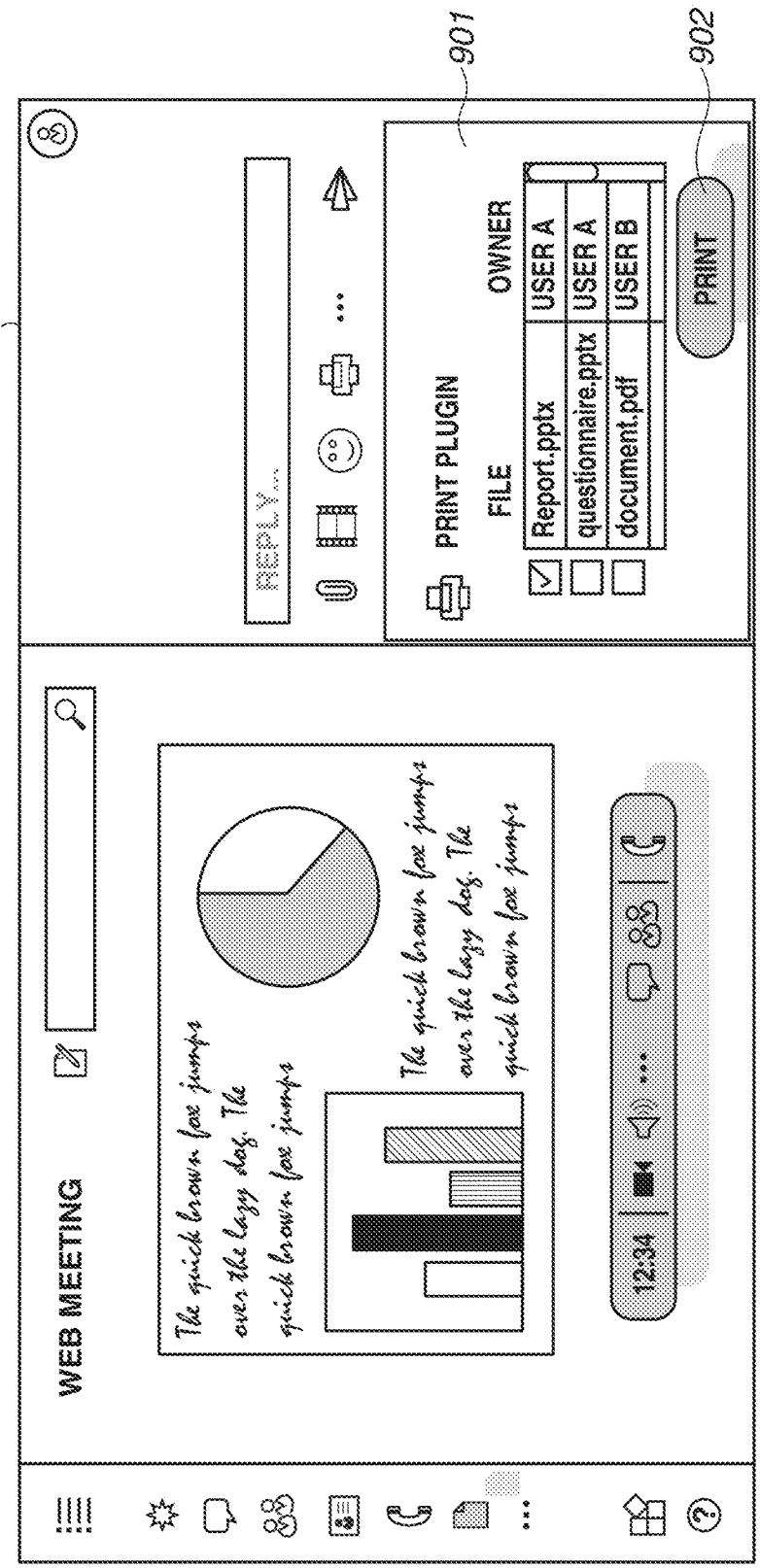

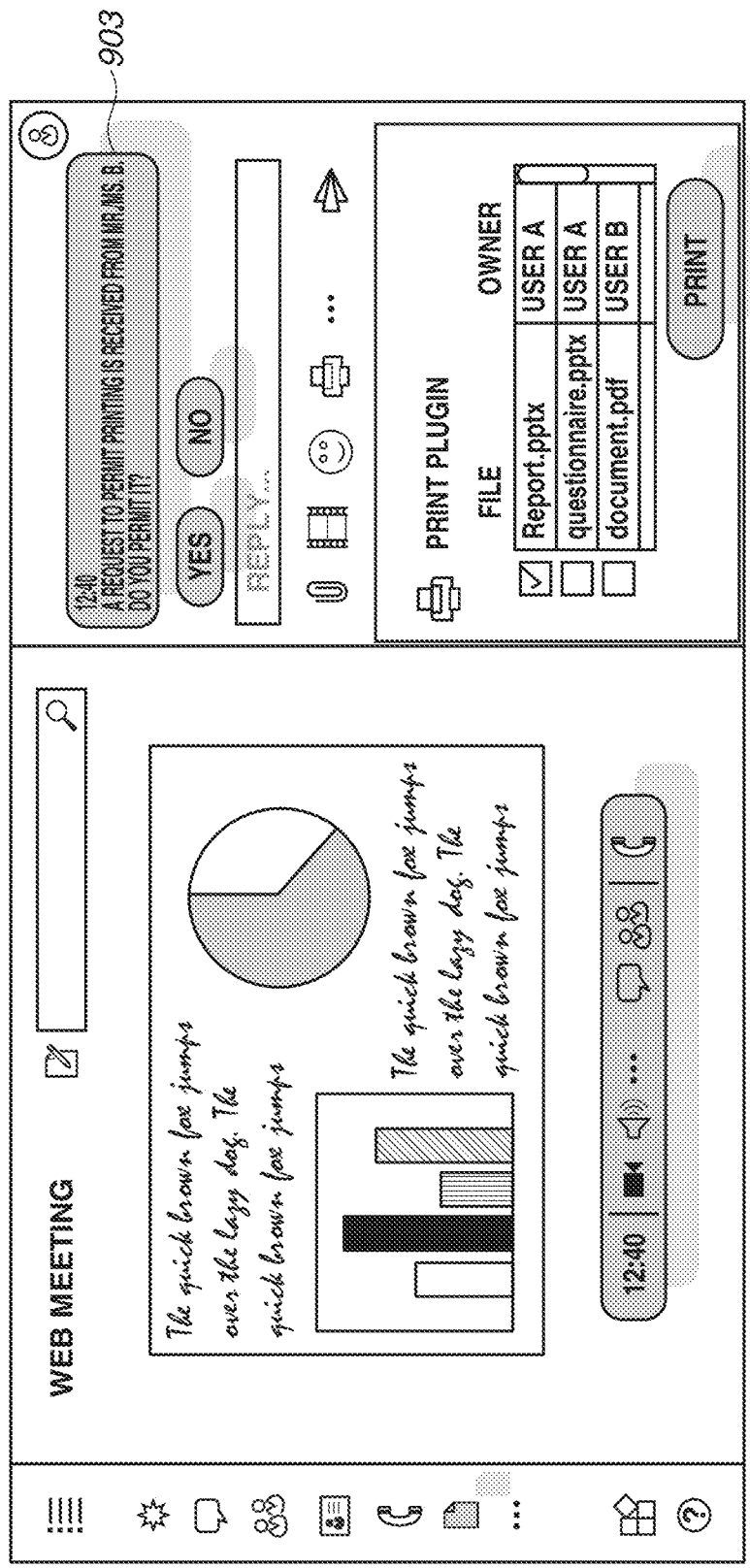

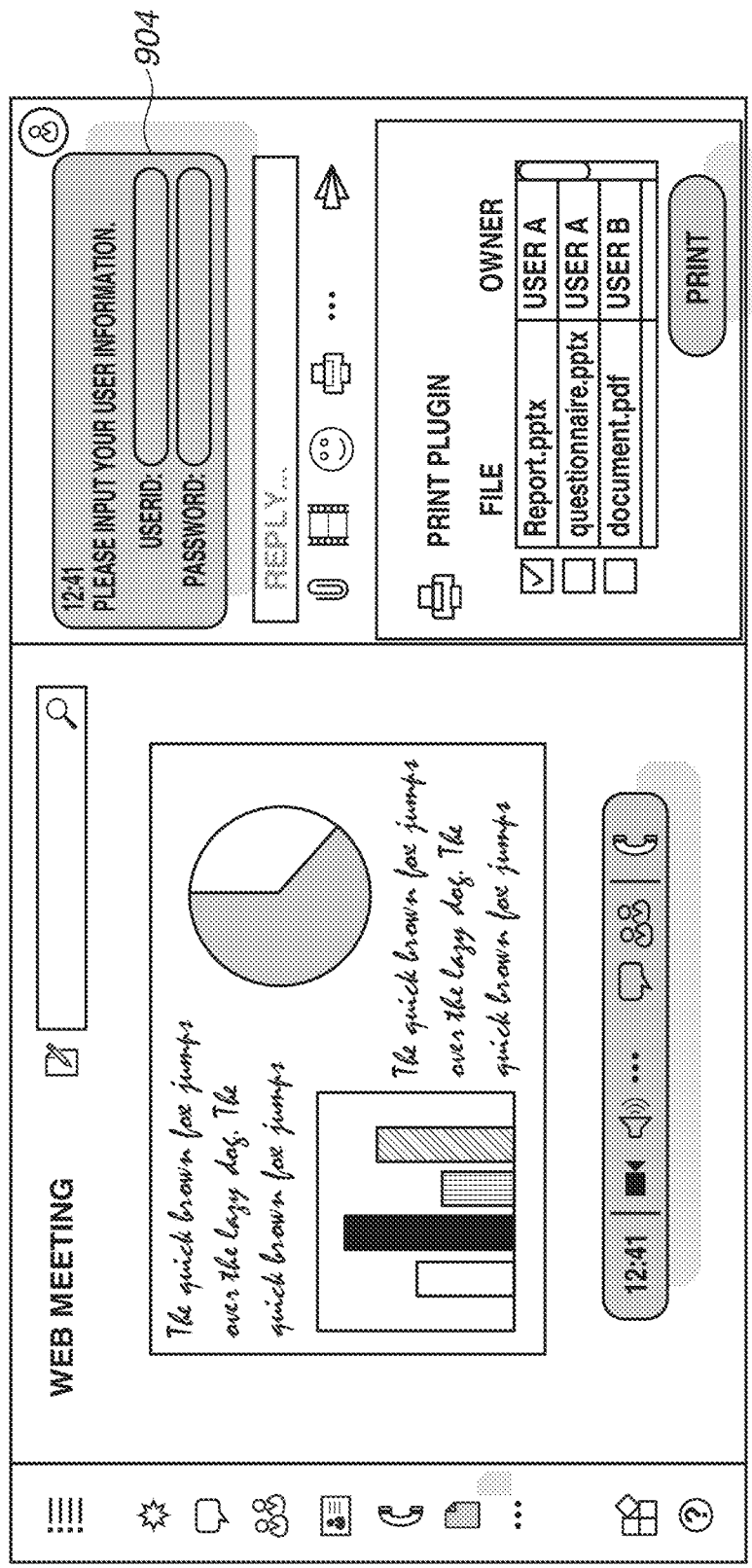

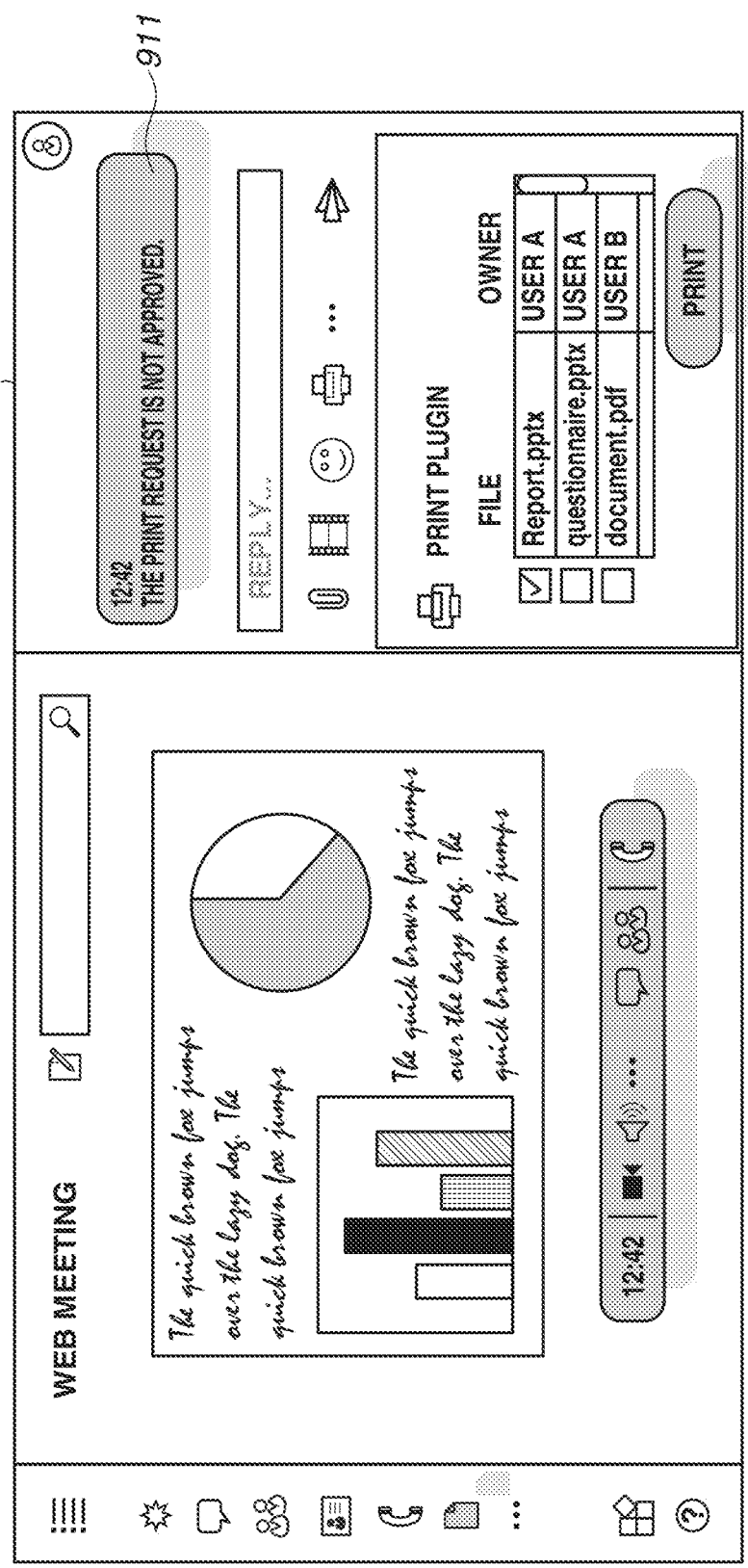
FIG.9B1

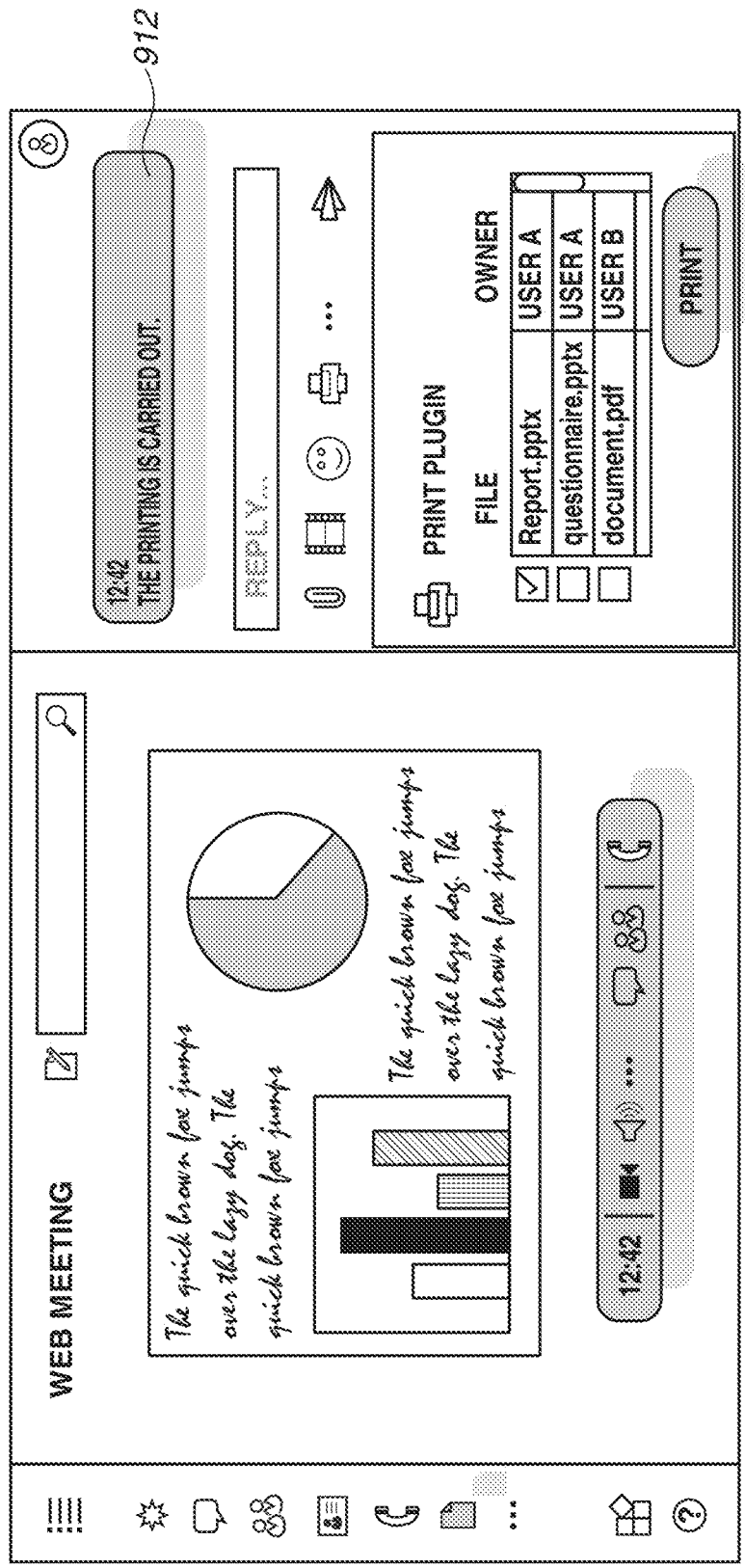
FIG.9B2

AUTHORIZATION CONTROL FOR A PRINTING SYSTEM

BACKGROUND

Field

The present relates to a printing system and a server used in the printing system.

Description of the Related Art

In recent years, due to the prevalence of telework and work from home, a work pattern of performing tasks from home or a satellite office has been becoming mainstream. The growing needs for adapting to such a change in the work style have led to rising popularity of business chatting, such as Microsoft Teams (registered trademark) and Slack (registered trademark), and a web meeting system, such as Zoom (registered trademark). The business chatting and the web meeting system can be used without relying on a terminal or an operating system (OS) by utilizing a service on a cloud. These techniques facilitate sharing and editing of a material and collaboration with a cloud storage and another application and allow a task to be completed on the business chatting, and therefore has faced ever surging needs.

On the other hand, these circumstances also have caused image forming apparatuses to be required to carry out printing in all sorts of places and have led to an increase in use cases of printing at home and in satellite offices, also having resulted in attention attracted to cloud print systems capable of realizing the printing (for example, refer to Japanese Patent Application Laid-Open No. 2013-238924). One of operations seen in the recent cloud print services is to print a job from the cloud print system using a bot or a print plug-in system (Azure or Amazon Web Services (AWS)) in the business chatting or the web meeting system. Another operation also seen therein is to use a service of, for example, associating and managing an account for the business chatting and an account for the cloud print system.

As a result, it has become possible to print a file in the business chatting or the web meeting system or a file in the cloud storage associated with the file in the business chatting or the web meeting system during the chat or not via a driver. Further, it also has become possible for a presenter and an audience in the middle of the web meeting to print a file from an arbitrary image forming apparatus even during the web meeting.

As described above, the presenter may cause the audience to share the material and the audience may print it using the cloud print during the meeting using the web meeting system.

However, in a case where the presenter sets an access restriction on the shared material, the audience cannot print the material because they do not have a right to access the material. In a case where the audience has the presenter remove the access restriction on the material, the audience needs to have the presenter suspend the presentation first, which is extremely cumbersome.

Because a function of permitting only some specific audience to access the material is not available depending on the web meeting system in use, the presenter may also be unable to permit a specific audience to print the material in some cases.

SUMMARY

According to an aspect of the present disclosure, a printing system including a server connected to a first information processing apparatus and a second information processing apparatus via a network includes a reception unit configured to receive a request to print a file from the second information processing apparatus and a determination unit configured to determine whether a user associated with the second information processing apparatus has a right to print the file, wherein the printing system transmits a first notification for requesting a confirmation about whether to grant the right to the first information processing apparatus in a case where the determination unit determines that the user does not have the right, and wherein the printing system permits the file to be printed from a printing apparatus connected to the server in a case where a confirmation to grant the right is received from the first information processing apparatus as a response to the first notification.

Further features of the present disclosure will become apparent from the following description of exemplary embodiments with reference to the attached drawings.

BRIEF DESCRIPTION OF THE DRAWINGS

FIGS. 9A1 to 9A3 each illustrate an example of an operation screen.

FIGS. 9B1 and 9B2 each illustrate an example of an operation screen.

DESCRIPTION OF THE EMBODIMENTS

Each exemplary embodiment for implementing the present disclosure will be described with reference to the drawings.

Each exemplary embodiment that will be described below is merely cited as one example, and is not intended to limit the scope of the present disclosure thereto. Not all of combinations of features that will be described in the following exemplary embodiment are necessarily essential to a solution of the present disclosure.

Figure 1:
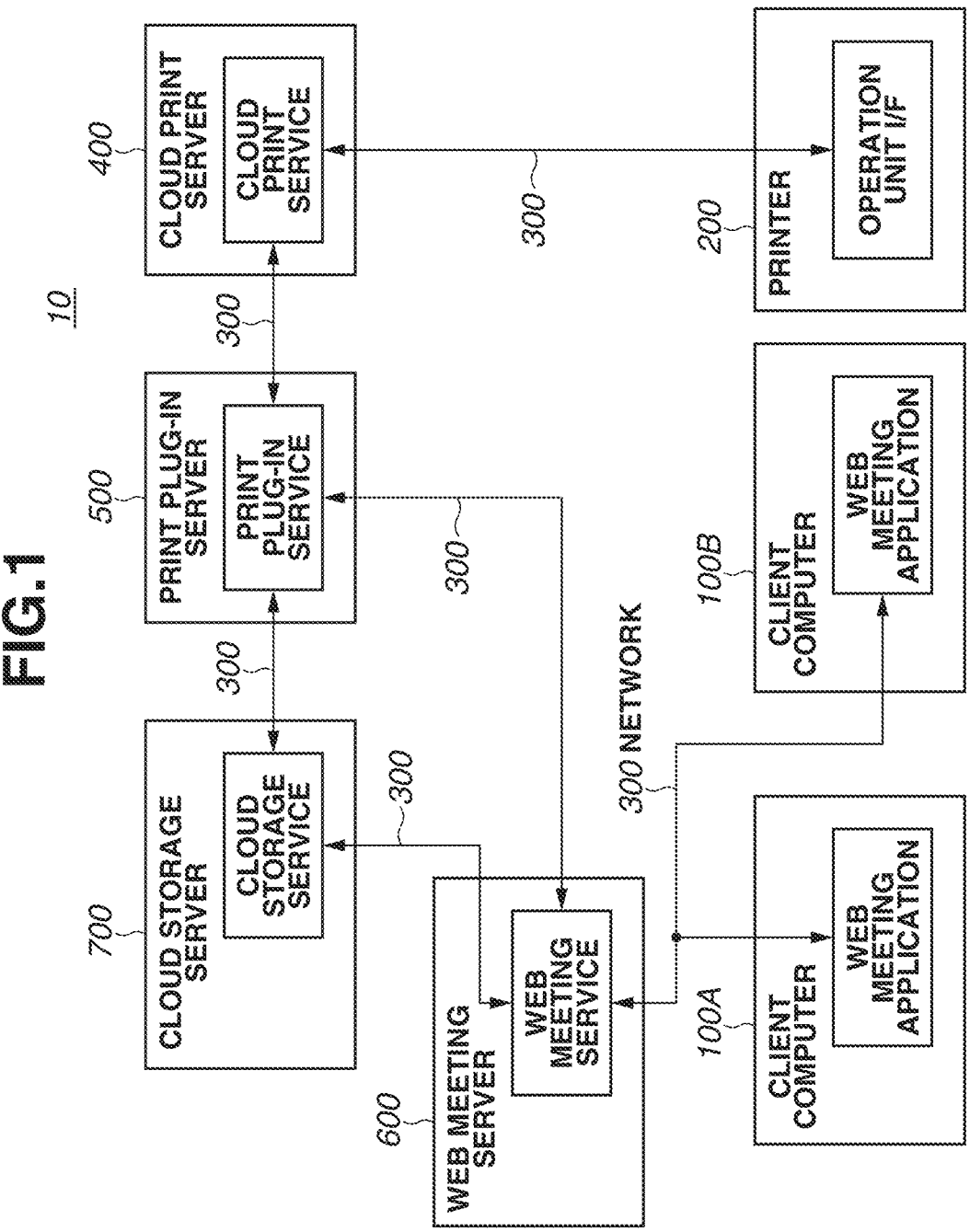
FIG. 1 illustrates a network configuration of a printing system.

FIG. 1 is a network configuration diagram schematically illustrating an environment of a printing system 10 in a web meeting according to the present exemplary embodiment.

A network 300 is a network for communicating with the outside, such as the Internet. The network 300 is configured to be able to connect a client computer 100, a web meeting server 600, a cloud storage server 700, a print plug-in server 500, a cloud print server 400, and a printer 200.

The cloud print server 400 provides a cloud print service on the Internet that is constructed on a cloud, which is a server system including a plurality of servers (i.e., constructed on a server system). The cloud print server 400 can be connected to the client computer 100, the printer 200, and the print plug-in server 500 via the network 300. The cloud print server 400 manages an account using account information including a user identification (ID) and a password, and a user can access a cloud print service group using the account information. Similarly, the user's account information for accessing the cloud print server 400 is also stored in the print plug-in server 500.

The web meeting server 600 provides a cloud service on the Internet that is constructed on a cloud including a plurality of servers (i.e. constructed on a server system) that can be connected from the client computer 100 using an application or a browser. The web meeting server 600 can provide a service that allows users to, for example, talk online by accessing the web meeting server 600 from various terminals at the same time and share a file among the users by uploading the file. The web meeting server 600 can store a file and account information group by group or account by account in a space in the cloud server called a tenant or a workspace.

The print plug-in server 500 provides a cloud service that intermediates between the web meeting server 600 and the cloud print server 400, and acquires a print request and a file from the web meeting server 600 via an application programming interface (API). The print plug-in server 500 includes a file storage for temporarily storing the acquired file and an account information database in which login information for accessing the print server 400 is stored.

The cloud storage server 700 provides a file storage service on the cloud. The cloud storage server 700 can, for example, allow a file stored in the storage to be downloaded, allow a Uniform Resource Locator (URL) to be referred to, and control access to a file via an API in collaboration with the web meeting server 600 and the print plug-in server 500.

The client computer 100 is an information processing apparatus embodied by, for example, a personal computer (PC). The client computer 100 is set up in, for example, a user's home or a satellite office. FIG. 1 illustrates two client computers (100A and 100B). In the present exemplary embodiment, the client computer 100A is associated with a user A and the client computer 100B is associated with a user B, as will be described below. More specifically, the client computer 100A is operated by the user A, who is a presenter in the web meeting, and the client computer 100B is operated by the user B, who is an audience in the web meeting. However, a plurality of computers may be connected as the client computers 100A and 100B.

The printer 200 is an image forming apparatus embodied by, for example, a multifunctional peripheral (MFP). A plurality of printers may be set up near the respective client computers 100 so as to allow each of the users to acquire a printout. The printer 200 is set up near the client computer 100B located in the home of the user who is the audience or the satellite in the present exemplary embodiment, but may be set up at another location.

Figure 2:
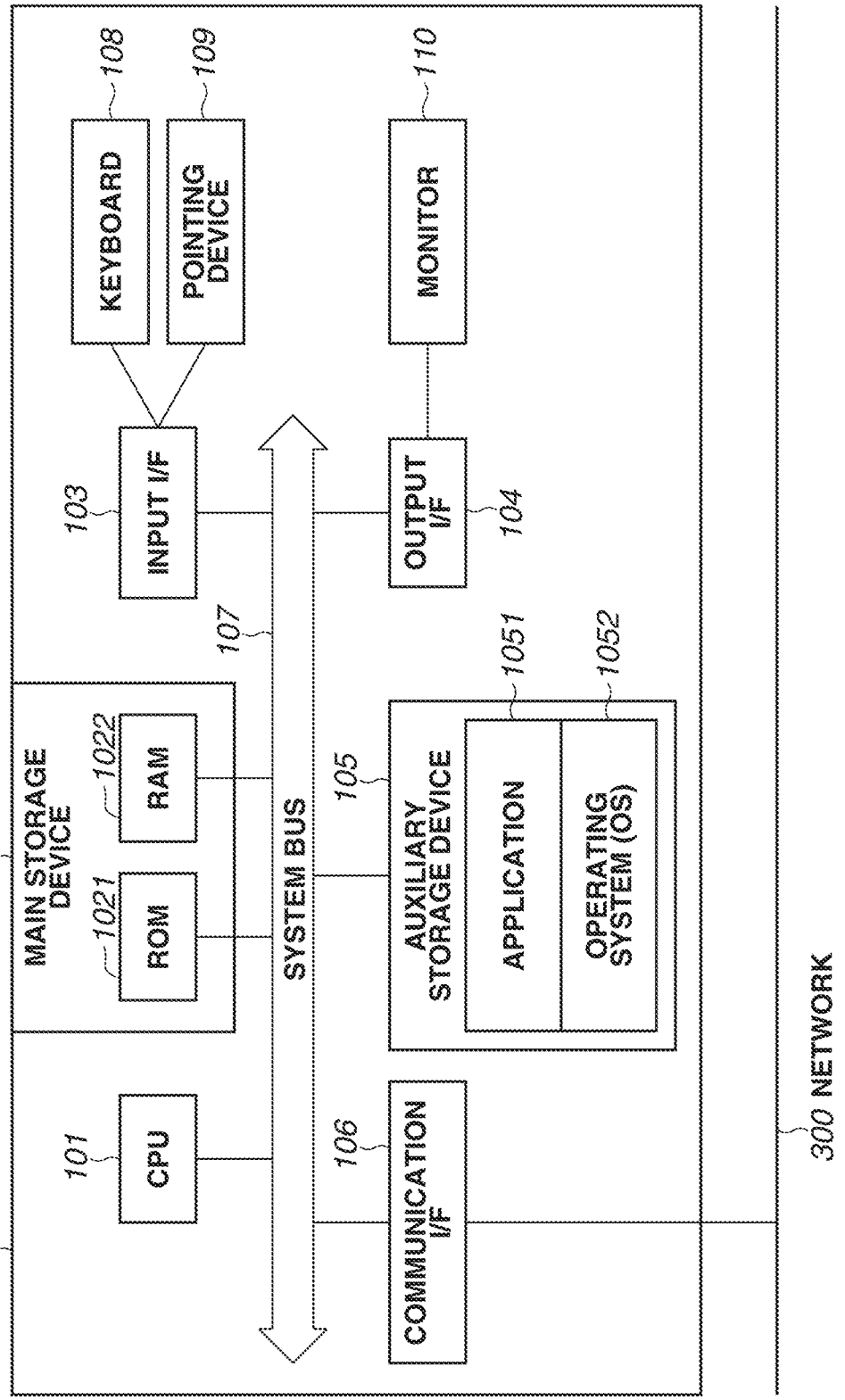
FIG. 2 illustrates a hardware configuration of a client computer.

FIG. 2 is an example of a hardware configuration diagram of the information processing apparatus used as the client computer 100 according to the present exemplary embodiment. The present exemplary embodiment can be applied even to any of a single function, a system including a plurality of apparatuses, and a system in which processing is performed with a connection established via a network as long as the functions of the present exemplary embodiment can be fulfilled, unless otherwise indicated specifically. The client computer 100 is formed by hardware illustrated in FIG. 2.

A central processing unit (CPU) 101 controls the entire apparatus according to a program stored in a read only memory (ROM) 1021 or a random access memory (RAM) 1022 in a main storage device 102, or an axillary storage device 105.

The RAM 1022 is also used as a work area when the CPU 101 performs various kinds of processing. The axillary storage device 105 records an application 1051, an operating system (OS) 1052, and the like therein. In the present exemplary embodiment, a web meeting application, which is an interface (I/F) for entering an input to the web meeting server 600, is stored in the application 1051. The main storage device 102 and the axillary storage device 105 may be collectively referred to as a storage device.

Input devices such as a pointing device 109 represented by a mouse, a touch panel, and the like, and a keyboard 108 are devices used for the user to issue various kinds of instructions to the computer. These input devices are connected to the CPU 101 or the like via an input I/F 103.

An output I/F 104 is an interface for outputting data to the outside, and outputs data to an output device such as a monitor 110.

Figure 3:
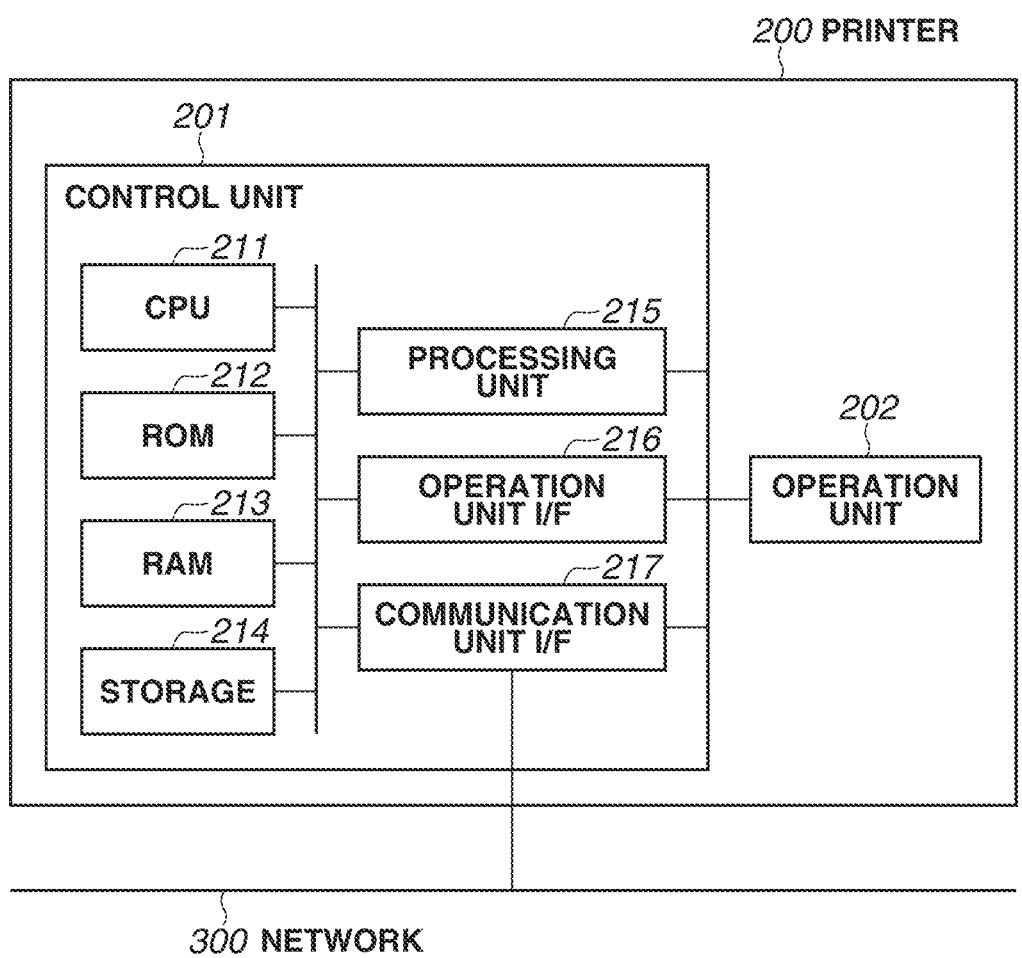
FIG. 3 is a block diagram illustrating a configuration of a printer.

FIG. 3 is a block diagram illustrating an example of the configuration of the image forming apparatus used as the printer 200 according to the present exemplary embodiment.

A control unit 201 including a CPU 211 controls the operation of the entire printer 200. The CPU 211 reads out a control program stored in a ROM 212 or a storage 214, and performs various kinds of control, such as print control and reading control.

The ROM 212 stores a control program executable by the CPU 211 therein. A RAM 213 is a main storage memory of the CPU 211, and is used as a work area or a temporary storage area for developing various kinds of control programs. The storage 214 stores print data, image data, various kinds of programs, and various kinds of setting information therein. In the present exemplary embodiment, an auxiliary storage device such as a hard disk drive (HDD) is assumed to be used as the storage 214, but the printer 200 may be configured to use a nonvolatile memory such as a solid state drive (SSD), instead of the HDD. In this manner, the hardware such as the CPU 211, the ROM 212, and the RAM 213 form a so-called computer.

A processing unit 215 has a function as a raster image processor (RIP) that rasterizes print data received via the network 300 to generate a print image. The processing unit 215 has a function as an image processing unit, and can also perform a resolution conversion of an image and correction processing. The image processing unit is assumed to be realized by a hardware circuit (for example, an application specific integrated circuit (ASIC) or a field programmable gate array (FPGA)) in the present exemplary embodiment, but is not limited thereto. For example, the printer 200 may include a processor designed for use in image processing, and the processor may realize the image processing and the processing for rasterizing the print data by executing an image processing program. Further alternatively, the printer 200 can also be configured in such a manner that the CPU 211 executes a program for performing the image processing, thereby performing the image processing and the processing for rasterizing the print data. The printer 200 may also be configured to perform the image processing by a combination of any of them.

An operation unit I/F 216 connects an operation unit 202 and the control unit 201 to each other.

The operation unit 202 includes a liquid crystal display unit having a touch panel function, various kinds of hardware keys, and the like. The operation unit 202 functions as a display unit that displays information, a reception unit that receives an instruction from a user, and a reading unit that reads a document to generate a read image.

Assume that the read image data is stored in the storage 214 or the RAM 213. The print data generated by analyzing the print data by the processing unit 215 is transferred from the control unit 201 to a printing unit (not illustrated) in the operation unit 202 via the operation unit I/F 216. The operation unit 202 receives a control command and the print data via the control unit 201, and prints an image on a sheet fed from a sheet feeding cassette (not illustrated) based on the print data.

The control unit 201 is connected to the network 300 via a communication unit I/F 217. The communication unit I/F 217, for example, transmits image data and information to a communication apparatus in the network 300 and receives image data and information from a communication apparatus in the network 300.

Figure 4:
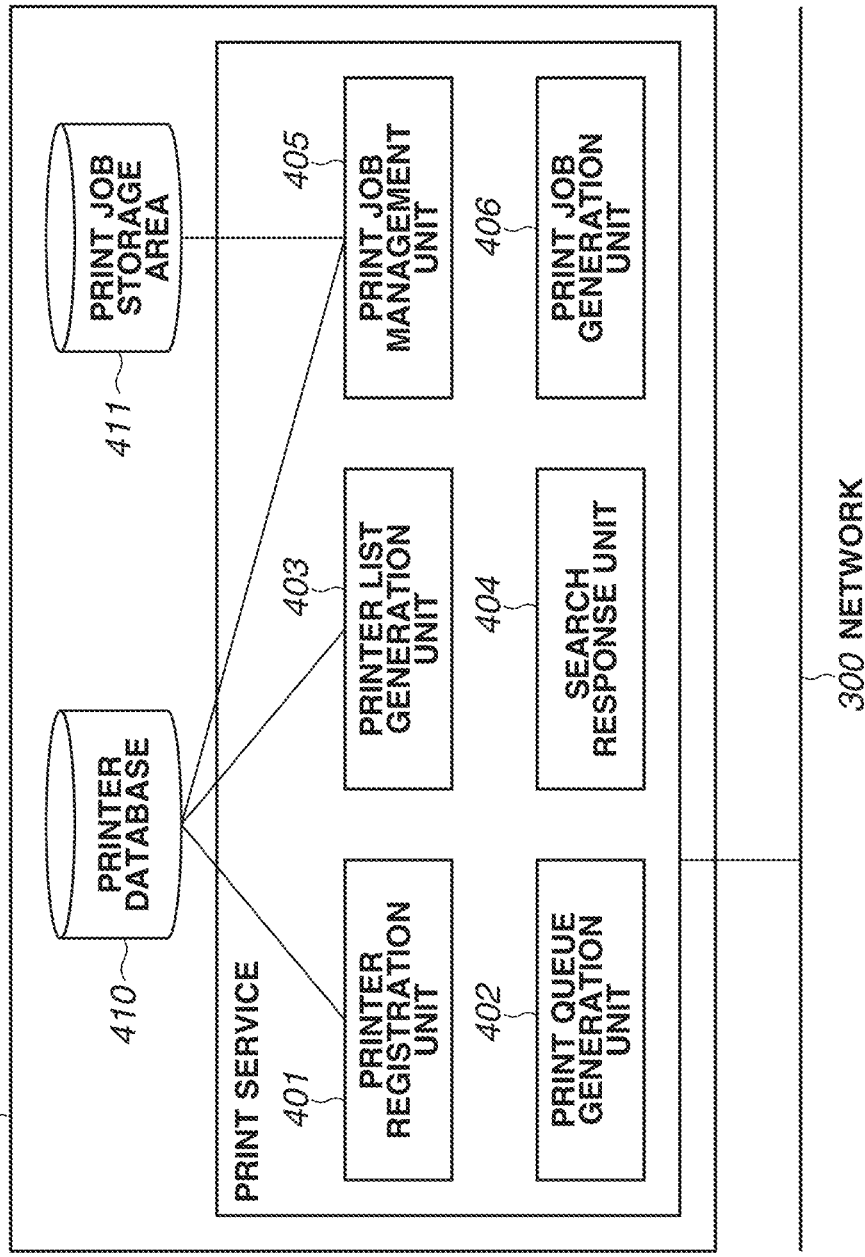
FIG. 4 is a functional block diagram of a cloud print service.

FIG. 4 is a functional block diagram of the cloud print server 400 according to the present exemplary embodiment.

The cloud print server 400 is a service on the cloud via the network 300, and provides a function relating to printing. The cloud print server 400 has functions as a printer registration unit 401, a print queue generation unit 402, a printer list generation unit 403, a search response unit 404, and a printer database 410. Further, the cloud print server 400 has functions as a print job management unit 405, a print job generation unit 406, and a print job storage area 411. The functions may be provided in another cloud print server working in collaboration with the cloud print server 400.

When a registration instruction is received from the printer 200, the printer registration unit 401 causes the print queue generation unit 402 to generate a print queue and registers the generated print queue with the printer database 410 in association with printer identification information.

The printer identification information is to be described. In the present exemplary embodiment, the printer identification information is assumed to be an identifier such as a universally unique identifier (UUID) that a vendor assigns to each printer. However, the printer identification information is not limited to the UUID, and may be machine model information, vendor information, or a basic function regarding the printer such as color/monochrome. In the present exemplary embodiment, when the print queue and the printer identification information of the printer are registered in association with each other, this will be referred to as the state that the printer is registered. Various attributes may be added to the printer registered at this time. Examples of the added attributes include the location of the printer, and the account information about a user having a right to access the registered printer.

The printer list generation unit 403 generates a list of registered printers.

The search response unit 404 returns information about the registered printer in response to a request to search for a printer from the client computer 100 to the cloud print server 400.

The print job management unit 405 receives a print job from the client computer 100, the print plug-in server 500, or the like, and directly transmits the print job to the printer 200 depending on the situation. Alternatively, the print job management unit 405 first stores the received print job into the print job storage area 411. Then, at a timing when a printer to which the print job is output is determined, the print job management unit 405 transfers the print job to the print job generation unit 406, and converts a format of the print job into an appropriate format and transmits the print job in the appropriate format to the printer 200.

Figure 5:
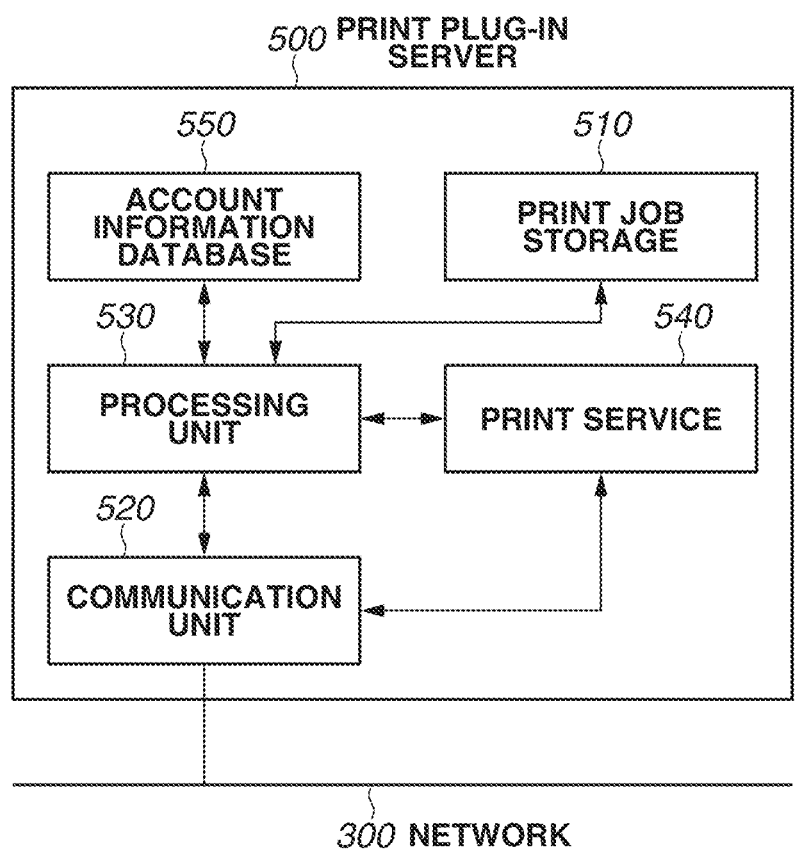
FIG. 5 is a functional block diagram of a print plug-in service.

FIG. 5 is a functional block diagram of the print plug-in server 500 according to the present exemplary embodiment.

The print plug-in server 500, for example, receives an instruction from the web meeting server 600 on the application and returns a result to display the result on the web meeting. The print plug-in server 500 can receive an instruction from the user via the web meeting server 600 even while the user is attending a meeting held as the web meeting.

A print job storage 510 is a storage device for storing a material (a file) to be printed that the user specifies by operating the client computer 100. A communication unit 520 is a module for carrying out network communication. A processing unit 530 is a module for processing the image data and the instruction transmitted from the client computer 100 and transmitting the print job to the cloud print server 400. A print service 540 is a module group regarding printing that, for example, saves a change in the print settings and associates the print job and the print settings. An account information database 550 stores therein the user's account information required for job management and as authentication information.

Figure 6:
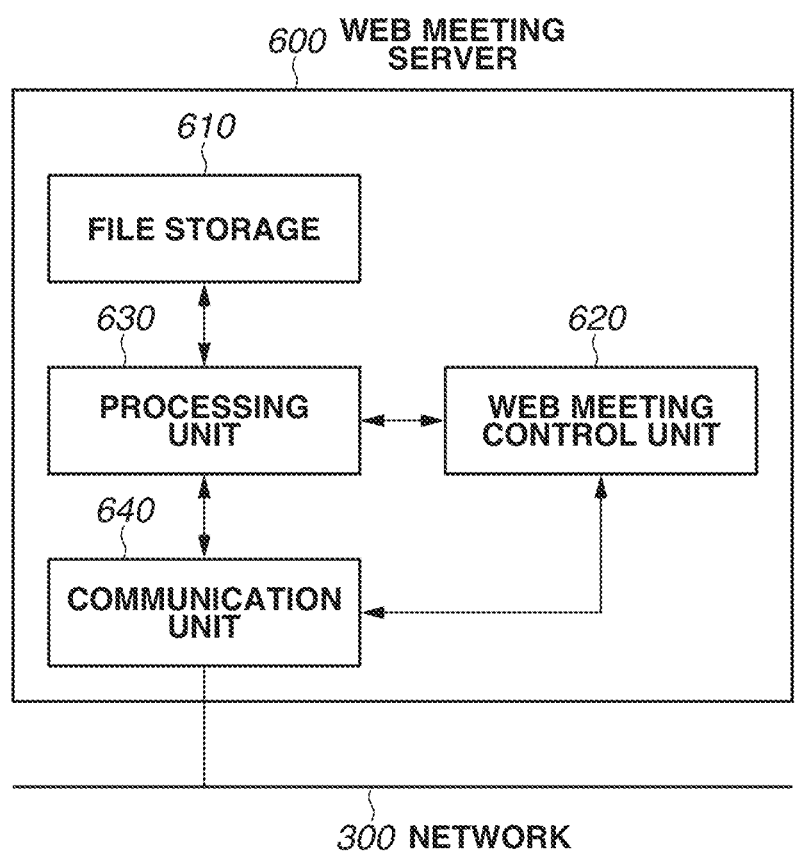
FIG. 6 is a functional block diagram of a web meeting server.

FIG. 6 is a functional block diagram of the web meeting server 600 according to the present exemplary embodiment.

The web meeting server 600 includes a file storage 610, a web meeting control unit 620, and the like. The file storage 610 stores therein image data about a material transmitted from the web meeting application stored in the application 1051 of the client computer 100.

The web meeting control unit 620 controls the progress of the web meeting. For example, the web meeting control unit 620 performs processing such as the transmission of an event of receiving a message to the print service 540 via the communication unit 520 of the print plug-in server 500 and the storage of image data received from the print plug-in server 500 into the file storage 610.

The web meeting control unit 620 functions as a module for collaborating with various applications. In the present exemplary embodiment, the web meeting control unit 620 can, for example, transmit a message to the application 1051 and share a file in collaboration with the cloud storage server 700 based on a request from the print plug-in server 500. When a message is exchanged between the plurality of client computers 100, the web meeting control unit 620 performs processing for relaying the message or sharing the file.

A processing unit 630 controls the entire operation of the web meeting server 600.

A communication unit 640 receives the print request from the client computer 100 and transmits a message for confirming permission of the printing to another client computer 100 in response to the print request. The communication unit 640 notifies the client computer 100 that the printing is carried out if the printing is permitted and notifies the client computer 100 that the printing is rejected if the printing is not permitted.

Figure 7:
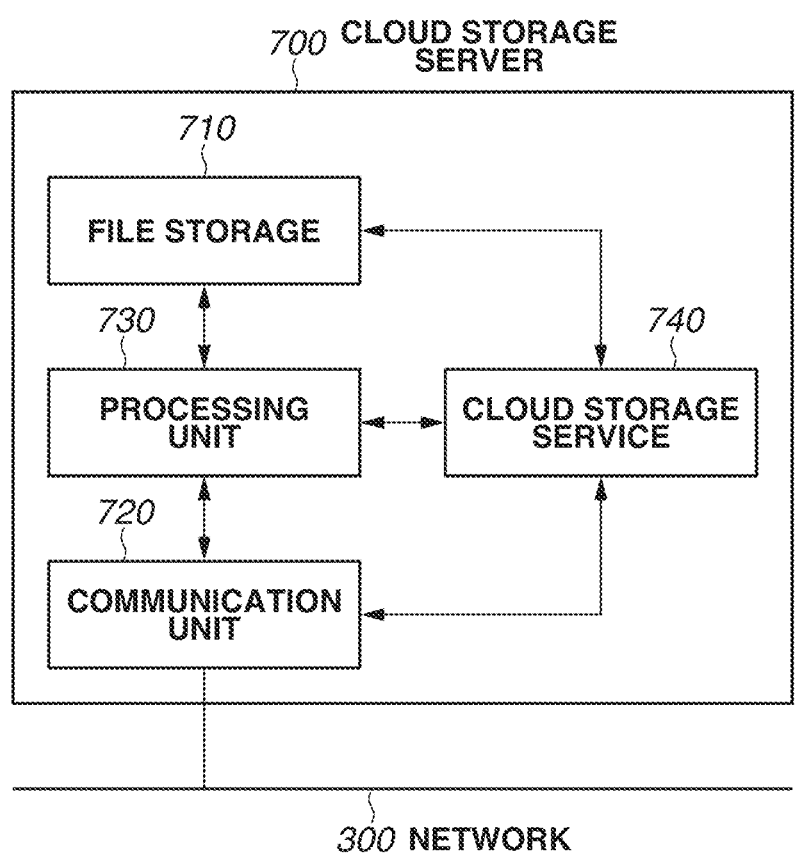
FIG. 7 is a functional block diagram of a cloud storage server.

FIG. 7 is a functional block diagram of the cloud storage server 700 according to the present exemplary embodiment.

The cloud storage server 700 includes a file storage 710, a cloud storage service 740, and the like. The file storage 710 is a cloud storage capable of storing a file therein. The file storage 710 is managed by each individual user. In other words, the file storage 610 of the web meeting server 600 is managed by an administrator who manages a tenant, but each individual user using the service becomes an administrator for the file storage 710 of the cloud storage server 700.

The cloud storage service 740 is a module for deploying various services including a service for collaborating with another application and an authentication service. The file storage 710 and the cloud storage service 740 are controlled by a processing unit 730, and communicate with the outside via a communication unit 720.

Figure 8:
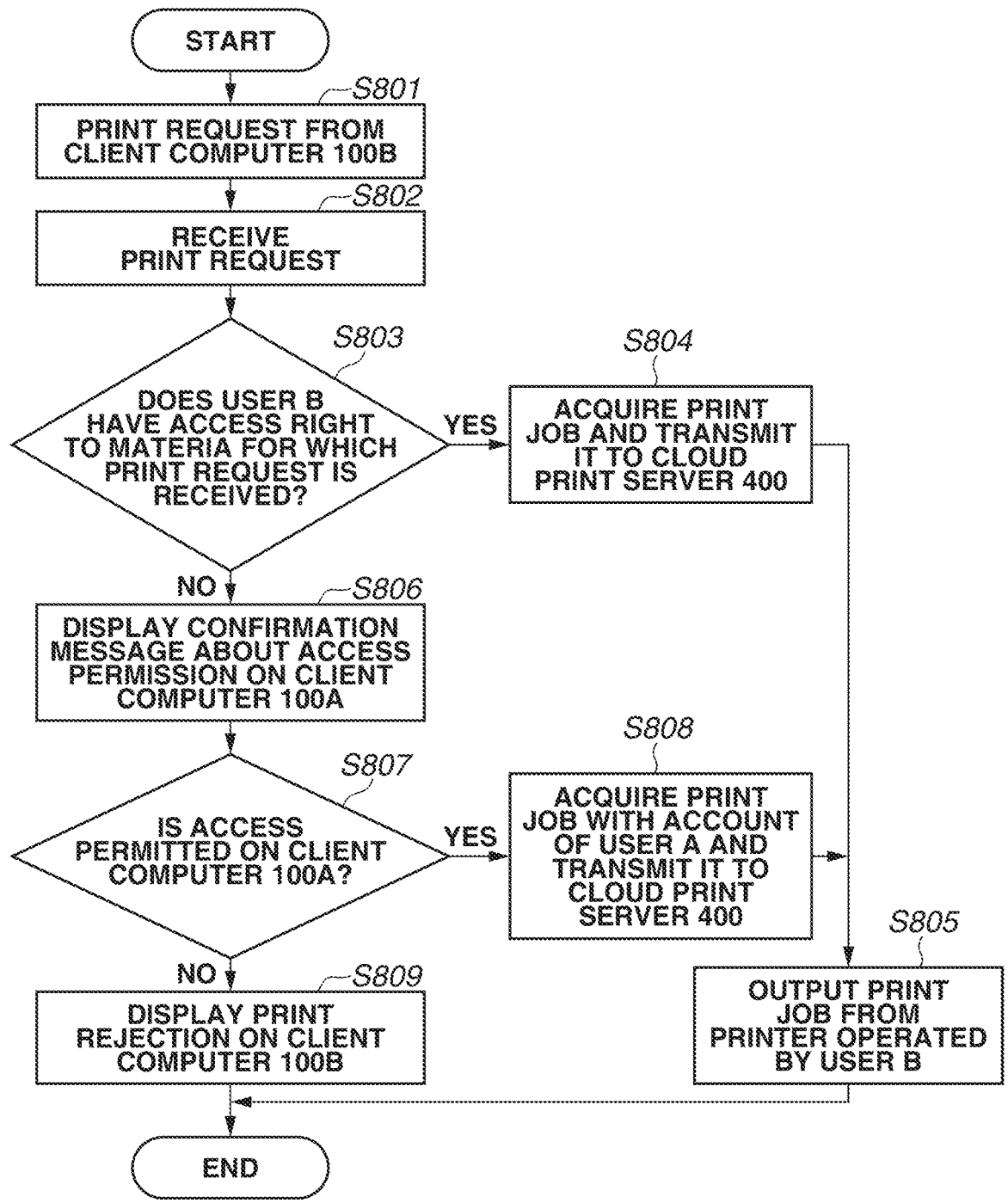
FIG. 8 is a flowchart illustrating processing when a user B prints a material.

FIG. 8 is a flowchart illustrating the processing when the user who is the audience prints the material (the file) used in the web meeting according to the present exemplary embodiment. In the flowchart illustrated in FIG. 8, assume that the presenter in the web meeting is the "user A" and the terminal used by the user A is the client computer 100A. Assume that the audience in the web meeting is the "user B" and the terminal used by the user B is the client computer 100B.

In the flowchart illustrated in FIG. 8, in step S801, the web meeting server 600 causes an operation screen 900 like the example illustrated in FIG. 9A1 to be displayed on the client computer 100B operated by the user B. At this time, when the user B selects an arbitrary material from a presentation material list 901 on the operation screen 900 and presses a Print button 902, the web meeting application of the client computer 100B notifies the web meeting server 600 of a request to print the material together with the user information about the user B. After that, the processing proceeds to step S802.

The presentation material list 901 indicates a list of all meeting materials that the user A, who is the presenter, stores into the file storage 610 of the web meeting server 600 or the file storage 710 of the cloud storage server 700 working in collaboration with the file storage 610 via the web meeting application of the client computer 100A.

In step S802, the web meeting server 600 receives the print request that the web meeting server 600 has been notified of from the web meeting application of the client computer 100B in step S801 via the communication unit 640. After that, the processing proceeds to step S803.

In step S803, the web meeting server 600 confirms whether the user B has a right to access the material specified in the print request from the client computer 100B that has been received in step S802. Having a right to access the material means being authorized to print the material in the web meeting.

If the user B has a right to access the material specified in the print request received by the web meeting server 600 in step S802 as a result of the confirmation in step S803 (YES in step S803), the processing proceeds to step S804. Otherwise (NO in step S803), the processing proceeds to step S806.

In step S804, the web meeting server 600 transmits the print request to the print service 540 of the print plug-in server 500. The print plug-in server 500 downloads the specified material from the cloud storage server 700 via the print service 540 based on the print request from the web meeting control unit 620.

If the specified material is identified as a file, the print plug-in server 500 acquires the file from the file storage 710 of the cloud storage server 700. If the specified material is identified as a URL, the print plug-in server 500 has the URL transmitted, and acquires the material by, for example, using an API stored in the cloud storage service 740 of the cloud storage server 700 or accessing the cloud storage server 700 via the web meeting control unit 620 of the web meeting server 600 based on the transmitted URL.

The web meeting server 600 performs processing for transmitting the print job to a print queue of the user B set in the cloud print server 400 via the print plug-in server 500. After that, the processing proceeds to step S805.

In step S805, the web meeting server 600 causes a user interface (UI) for print settings to be displayed on the client computer 100B. When the user B issues an instruction to carry out the printing while specifying the printer 200 connected to the cloud print server 400 as an output destination on the UI for print settings, the print job transmitted to the cloud print server 400 in step S804 is output from the printer 200. The web meeting server 600 causes a confirmation screen 910 like the example illustrated in FIG. 9B2 to be displayed on the client computer 100B of the user B, thereby notifying the user B that the printing is carried out. With the notification, the processing illustrated in the flowchart of FIG. 8 is terminated.

On the other hand, step S806 is performed when the user B is determined to have no right to access the material specified in the print request (NO in step S803). In this case, the web meeting server 600 causes a message 903 for confirming whether to grant the access right, like the example illustrated in FIG. 9A2, to be displayed on the operation screen 900 of the client computer 100A operated by the user A, who is the presenter.

In the present example, the user A, who is the presenter, is assumed to have an authority to revoke the right to access the above-described material. However, a person having the authority to revoke the right to access the above-described material may be another person such as the host of the web meeting besides the presenter.

After that, the processing proceeds to step S807.

In step S807, the web meeting server 600 determines whether the access right of the user B is granted by the user A as a response to the message 903 on the operation screen 900 displayed on the client computer 100A.

If the access right is granted (YES in step S807), the processing proceeds to step S808. Otherwise (NO in step S807), the processing proceeds to step S809.

In step S808, the print plug-in server 500 acquires the material specified in the print request from the file storage 710 of the cloud storage server 700 using the account information about the user A that is stored in the account information database 550.

The account information of the user A, information about the authorization of access to the cloud storage server 700, or an access token may not be stored in the account information database 550. In this case, the web meeting server 600 causes an input unit 904 requesting an input of the account information of the user A, like the example illustrated in FIG. 9A3, to be displayed on the operation screen 900 of the client computer 100A. Inputting the account information about the user A on the input unit 904 allows the print plug-in server 500 to access the cloud storage server 700 using the account information about the user A, thereby allowing the print plug-in server 500 to acquire the material specified in the print request.

After that, the processing proceeds to the above-described step, step S805.

Step S809 is performed when no right to access the material specified in the print request is granted by the user A on the operation screen 900 displayed on the client computer 100A. In this case, a message 911 indicating that the printing is not permitted, like the example illustrated in FIG. 9B1, is displayed on a confirmation screen 910 displayed on the client computer 100B of the user B. With this display, the processing illustrated in the flowchart of FIG. 8 is terminated.

The flowchart of FIG. 8 has been described assuming that the user who is the audience is only the single user B. However, the audience may be a plurality of users B. In this case, it is expected that two or more among the plurality of users B, who are the audience, may issue the requests to print the material, but the user A, who is the presenter, may determine whether to grant the access right for each of the users that transmit the print requests. As a result, the material is permitted to be printed only from the printer 200 specified by the user granted the access right among the users that transmit the print requests.

According to the present exemplary embodiment, in a web meeting, even a user granted no right to access a material can print the material without interrupting the meeting if a user who is a presenter gives a permission in the above-described manner.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-177846, filed Oct. 23, 2020, which is hereby incorporated by reference herein in its entirety.

What is claimed is:

1. A printing system including a server connected to a first information processing apparatus and a second information processing apparatus via a network, comprising:
    a communicator that receives a print instruction of a file from the second information processing apparatus; and
    a controller that determines whether a user associated with the second information processing apparatus has a privilege to print the file,
    wherein the communicator transmits a request of a confirmation about whether to grant the privilege to the first information processing apparatus in a case where the controller determines that the user does not have the privilege,
    wherein the controller requests, based on a response to the request of confirmation, authentication information of a predetermined user that has the privilege and that is associated with the first information processing apparatus to the first information processing apparatus, and
    wherein the communicator transmits the file obtained using the authentication information of the predetermined user to a printing apparatus connected to the server.

2. The printing system according to claim 1, wherein the printing apparatus is a printing apparatus specified as an output destination of the file by the second information processing apparatus.

3. The printing system according to claim 1, wherein the communicator transmits information indicating that the file is printed to the second information processing apparatus in the case where the privilege is not granted from the first information processing apparatus.

4. The printing system according to claim 1,
    wherein the communicator transmits information indicating that printing the file is rejected to the second information processing apparatus in a case where the privilege is not granted from the first information processing apparatus.

5. The printing system according to claim 1, further comprising a storage configured to store the file therein,
    wherein the controller obtains the file from the storage using the authentication information of the predetermined user.

6. A server connected to a first information processing apparatus and a second information processing apparatus via a network, the server comprising:
    a communicator that receives a print instruction of a file from the second information processing apparatus; and
    a controller that determines whether a user associated with the second information processing apparatus has a privilege to print the file,
    wherein the communicator transmits a request of a confirmation about whether to grant the privilege to the first information processing apparatus in a case where the controller determines that the user does not have the privilege,
    wherein the controller requests, based on a response to the request of confirmation, authentication information of a predetermined user that has the privilege and that is associated with the first information processing apparatus to the first information processing apparatus, and
    wherein the communicator transmits the file obtained using the authentication information of the predetermined user to a printing apparatus connected to the server.

7. The server according to claim 6, wherein the controller obtains the file from a storage server using the authentication information of the predetermined user.

8. The server according to claim 6,
    wherein the printing apparatus is a printing apparatus specified as an output destination of the file by the second information processing apparatus.

9. The server according to claim 6, wherein the communicator transmits information indicating that the file is printed to the second information processing apparatus in the case where the privilege is not granted from the first information processing apparatus.

10. The server according to claim 6,
wherein the communicator transmits information indicating that printing the file is rejected to the second information processing apparatus in a case where the privilege is not granted from the first information processing apparatus.

11. The server according to claim 6, wherein the printing apparatus is a printing apparatus specified as an output destination of the file by the second information processing apparatus.

12. A controlling method for a server connected to a first information processing apparatus and a second information processing apparatus via a network, the method comprising one or more processors configured to execute:

receiving a print instruction of a file from the second information processing apparatus;

determining whether a user associated with the second information processing apparatus has a privilege to print the file;

transmitting a request a confirmation about whether to grant the privilege to the first information processing apparatus in a case where it is determined that the user does not have the privilege;

requesting, based on a response to the request of confirmation, authentication information of a predetermined user that has the privilege and that is associated with the first information processing apparatus to the first information processing apparatus; and transmitting the file obtained using the authentication information of the predetermined user to a printing apparatus connected to the server.

\* \* \* \* \*